US011996558B2

(12) United States Patent
Wei et al.

(10) Patent No.: US 11,996,558 B2
(45) Date of Patent: May 28, 2024

(54) TERNARY POSITIVE MATERIAL OF LARGE MONOCRYSTAL-LIKE PARTICLES, METHOD FOR PREPARING THE SAME, AND LITHIUM-ION BATTERY HAVING THE SAME

(71) Applicant: XTC NEW ENERGY MATERIALS(XIAMEN) CO., LTD., Xiamen (CN)

(72) Inventors: Guozhen Wei, Xiamen (CN); Yaobin Ye, Xiamen (CN); Jingren Wang, Xiamen (CN); Nengjian Xie, Xiamen (CN); Pengfeng Wang, Xiamen (CN); Lin Lin, Xiamen (CN)

(73) Assignee: XTC NEW ENERGY MATERIALS(XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 17/882,825

(22) Filed: Aug. 8, 2022

(65) Prior Publication Data

US 2023/0080488 A1 Mar. 16, 2023

(30) Foreign Application Priority Data

Sep. 2, 2021 (CN) ......................... 202111026877.4

(51) Int. Cl.
*H01B 1/08* (2006.01)
*C01G 53/00* (2006.01)
(Continued)

(52) U.S. Cl.
CPC ............ *H01M 4/525* (2013.01); *C01G 53/50* (2013.01); *H01B 1/08* (2013.01); *H01M 4/131* (2013.01); *H01M 4/505* (2013.01); *H01M 10/0525* (2013.01); *C01P 2002/50* (2013.01); *C01P 2004/03* (2013.01); *C01P 2004/61* (2013.01); *C01P 2006/40* (2013.01); *H01M 2004/028* (2013.01)

(58) Field of Classification Search
CPC ........... H01B 1/00; H01B 1/08; H01M 4/131; H01M 4/505; C01G 53/50
See application file for complete search history.

(56) References Cited

U.S. PATENT DOCUMENTS

2016/0380304 A1* 12/2016 Kim .................... C04B 35/6261 429/189
2017/0317344 A1* 11/2017 Tan ................... H01M 10/0525
2022/0112094 A1* 4/2022 Xiao .................... C01G 53/006

FOREIGN PATENT DOCUMENTS

CN 106784686 A 5/2017
CN 107528064 A 12/2017
(Continued)

OTHER PUBLICATIONS

CN 107528064 (pub date Dec. 2017) English language machine translation.*
(Continued)

*Primary Examiner* — Mark Kopec
(74) *Attorney, Agent, or Firm* — ScienBiziP, P.C.

(57) ABSTRACT

A method for preparing ternary positive material in a lithium battery includes mixing nickel salt, cobalt salt, and manganese salt to form a mixed solution. A precipitant and a complexing agent are added into the mixed solution, thereby adjusting a pH value to a range of 10.5 to 12 and obtaining a precursor A. The precursor A and lithium salt are ground by a ball mill to obtain a precursor B, precursor B then being sintered in an air or oxygen atmosphere. The sintering includes heating at a first heating speed of 5 to 15° C./min to a first temperature of 400 to 800° C. and being held at such temperature for 1 to 6 h, and heating at a second heating speed of 1 to 10° C./min to a second temperature of 900 to 980° C. and being held there for 8 to 10 h.

11 Claims, 14 Drawing Sheets

(51) Int. Cl.

| | |
|---|---|
| ***H01M 4/131*** | (2010.01) |
| ***H01M 4/50*** | (2010.01) |
| ***H01M 4/505*** | (2010.01) |
| ***H01M 4/525*** | (2010.01) |
| ***H01M 10/0525*** | (2010.01) |
| *H01M 4/02* | (2006.01) |

(56) References Cited

FOREIGN PATENT DOCUMENTS

| | | | |
|---|---|---|---|
| CN | 110330060 | A | * 10/2019 |
| CN | 110492096 | A | 11/2019 |
| CN | 110863245 | A | 3/2020 |
| WO | 2020007176 | A1 | 1/2020 |

OTHER PUBLICATIONS

Nie et al "Effects of precursor particle size on the performance of LiNi0.5Co0.2Mn0.302 cathode material", Ceramics International 41 (2015) 15185-15192.*

Li et al "Comparison of single crystal and polycrystalline LiNi0.5Mn0.3Co0.202 positive electrode materials for high voltage Li-ion cells", J. Electrochem. Soc. 164 A1534 (2017).*

Duan et al "Recent progress on preparation and applications of layered double hydroxides", Chinese Chemical Letters 33 (2022) 4428-4436.*

English language machine translation of CN 110863245 (pub date Mar. 2020).*

* cited by examiner

TERNARY POSITIVE MATERIAL OF LARGE MONOCRYSTAL-LIKE PARTICLES, METHOD FOR PREPARING THE SAME, AND LITHIUM-ION BATTERY HAVING THE SAME

FIELD

The subject matter herein generally relates to lithium-ion batteries, and more particularly, to a ternary positive material of large monocrystal-like particles, a method for preparing the ternary positive material, and a lithium-ion battery having the ternary positive material.

BACKGROUND

Lithium-ion batteries have high specific capacitances and high cycle performances, and are very portable and environmentally friendly. The lithium-ion batteries are used in notebook computers, mobile phones, electric vehicles, and energy storage power supplies. Positive active materials are important in a lithium-ion battery. The positive active materials include lithium cobalt oxide, lithium manganate, lithium iron phosphate, and ternary materials. The ternary materials are becoming mainstream positive materials for the lithium-ion batteries.

Commercial ternary materials may be spherical or spherical-like secondary particles gathered by small primary particles. Such ternary material needs to be crushed when in use, which may cause damage to coating layers on the ternary material. Furthermore, the ternary material may be broken during a rolling process. Thus, the reaction between the positive material and electrolyte are intensified, resulting in poor stability and short cycle life of the positive materials.

BRIEF DESCRIPTION OF THE DRAWINGS

Implementations of the present technology will now be described, by way of embodiment, with reference to the attached figures.

Figure 3:
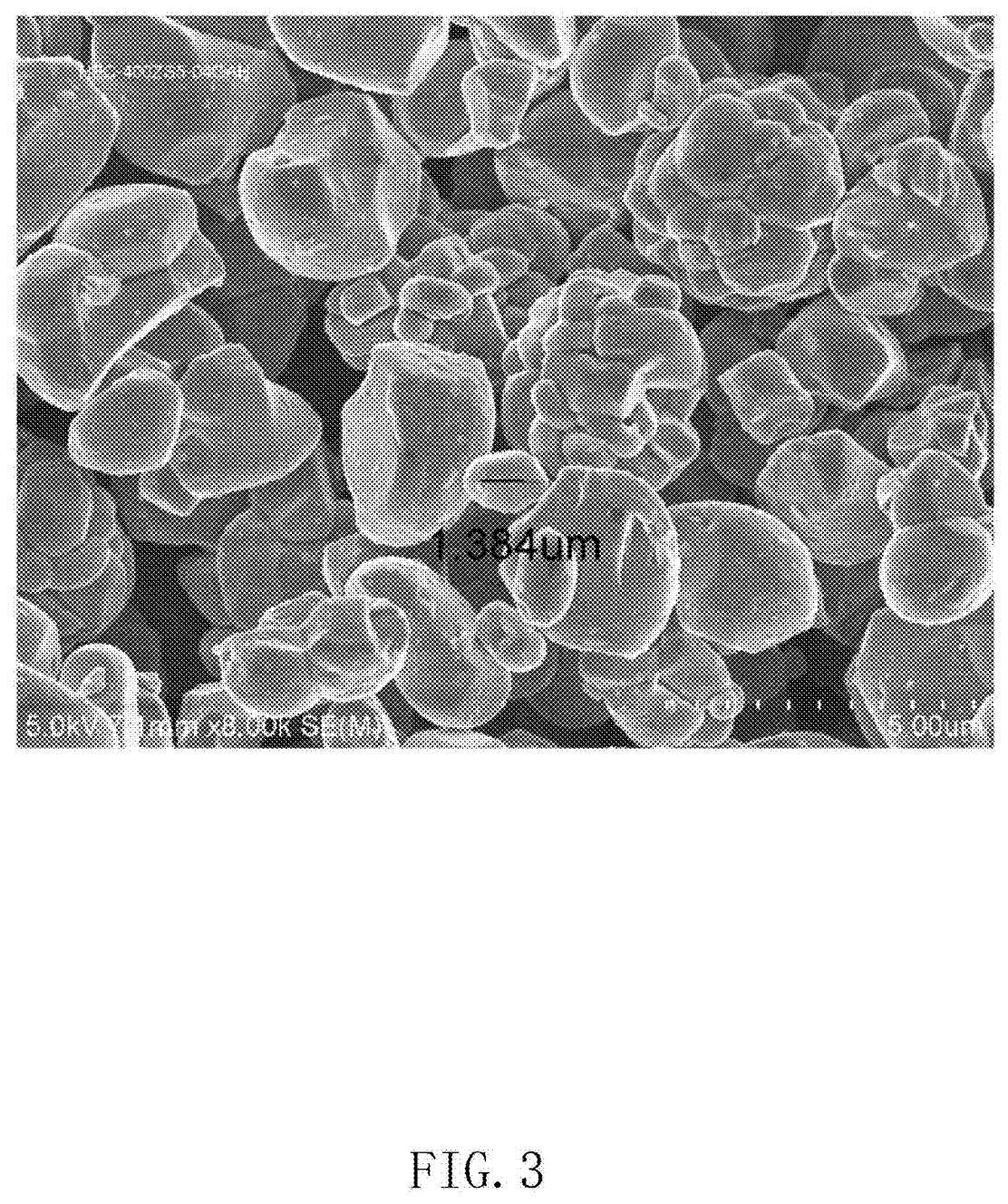

FIG. 3 is a scanning electron microscope (SEM) diagram of the ternary positive material prepared in example 1.

Figure 6:
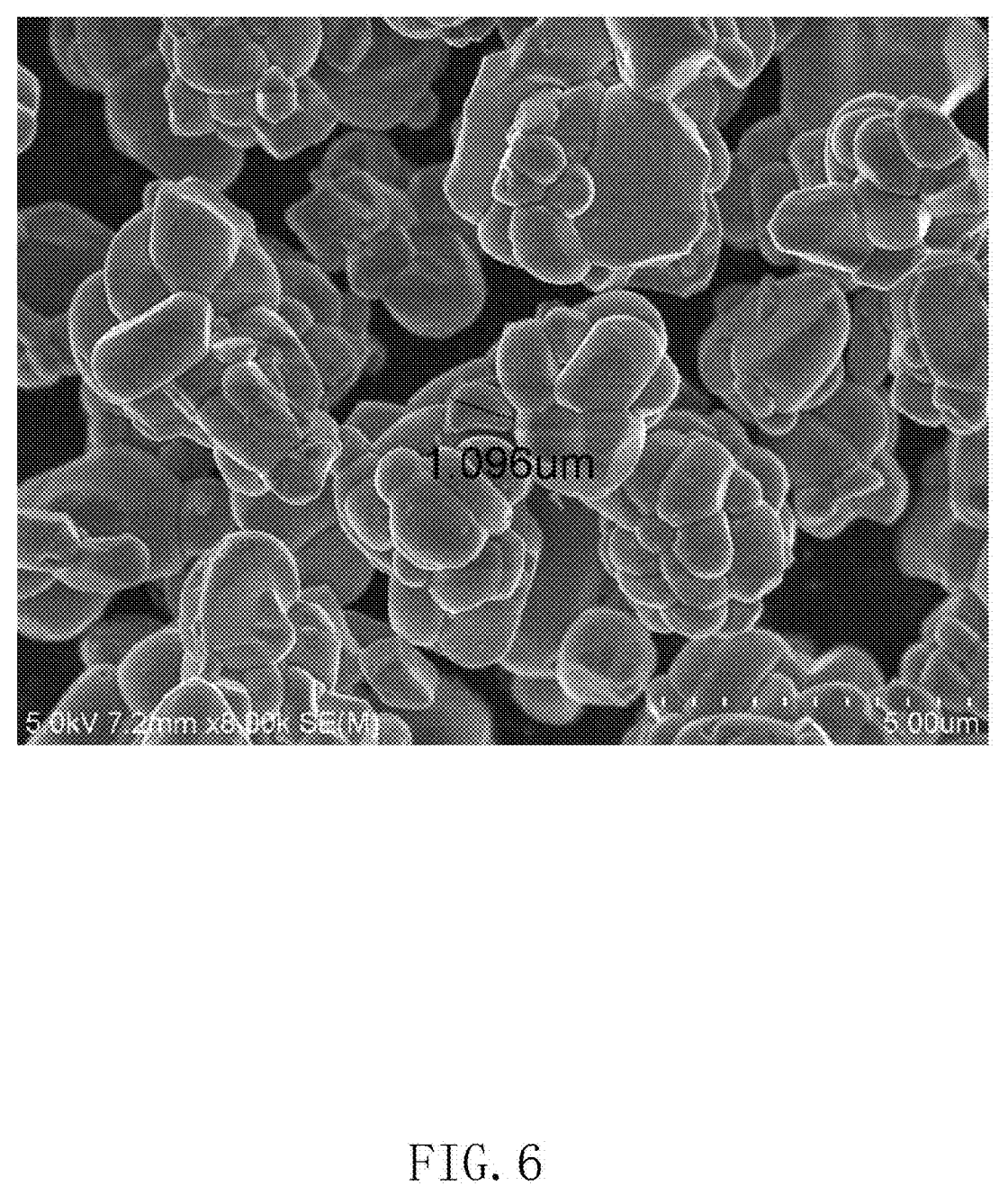

FIG. 6 is an SEM diagram of the ternary positive material prepared in example 4.

Figure 10:
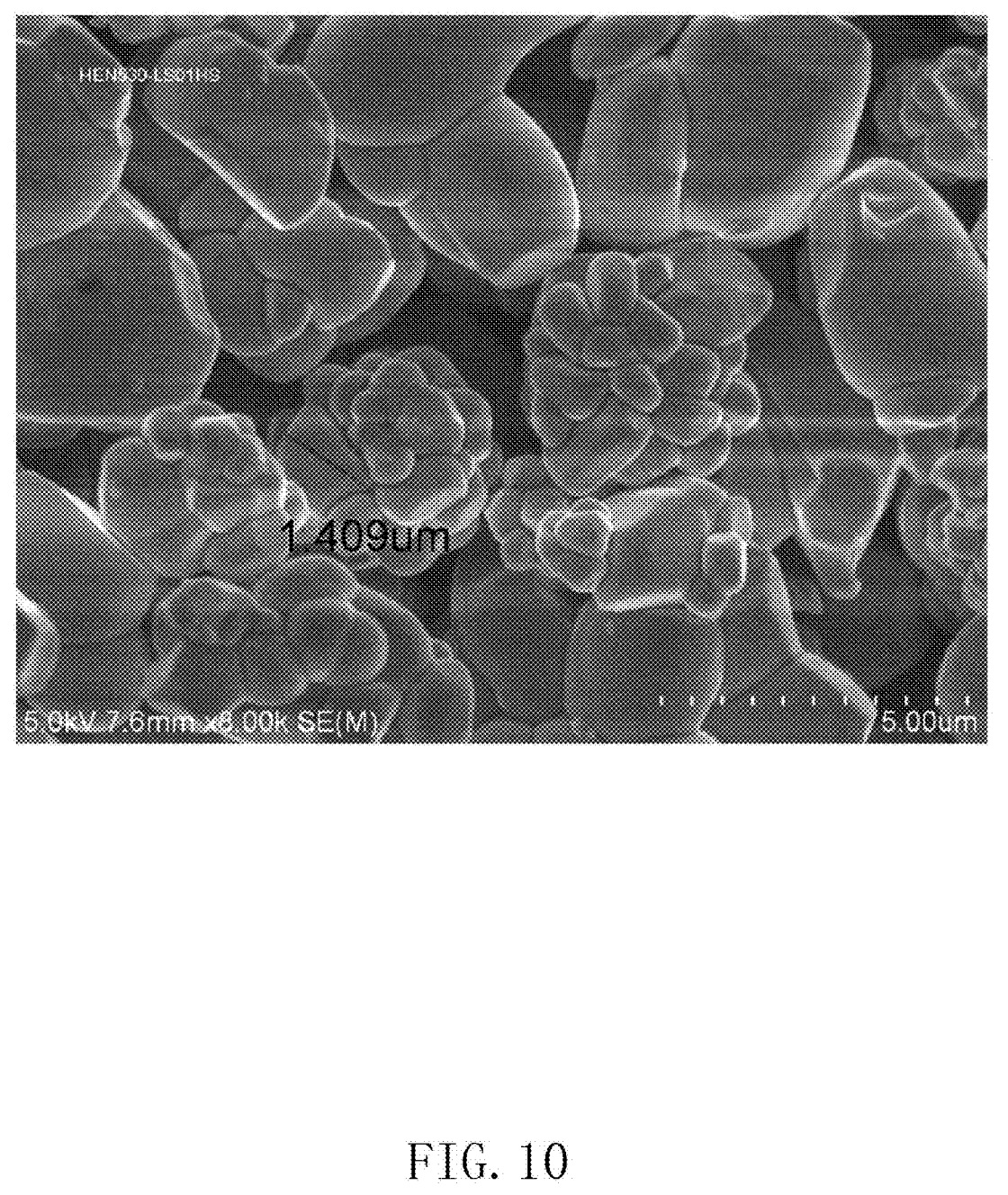

FIG. 10 is an SEM diagram of the ternary positive material prepared in example 8.

Figure 12:
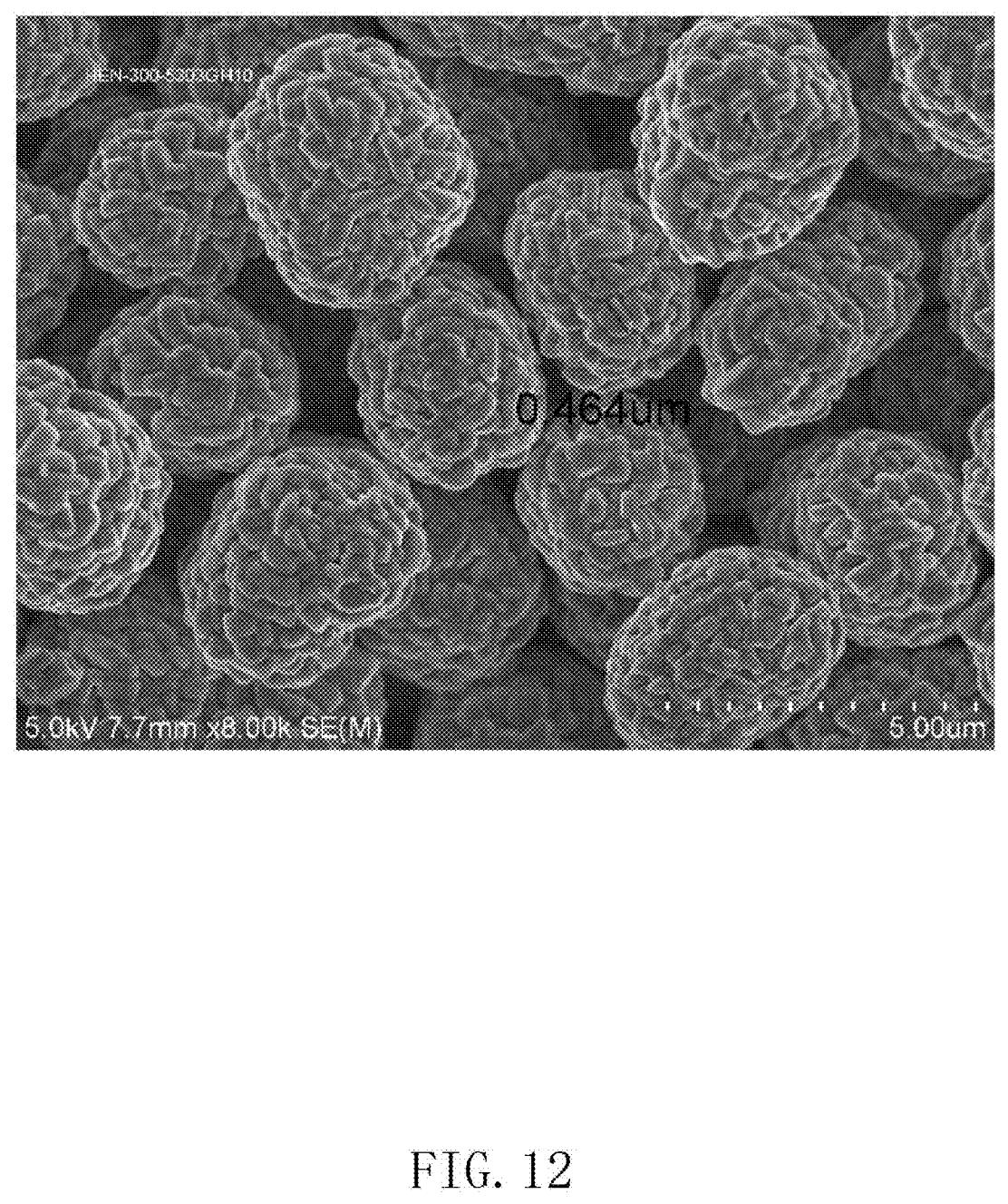

FIG. 12 is an SEM diagram of the ternary positive material prepared in comparative example 2.

DETAILED DESCRIPTION

Figure 1:
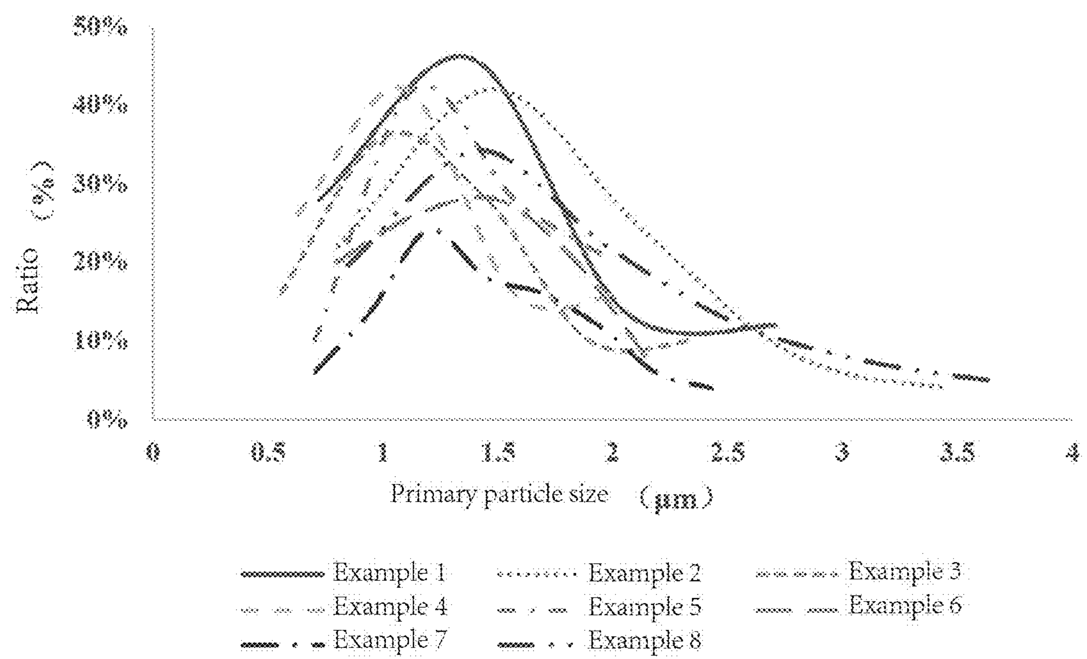
FIG. 1 is a diagram showing particle size distribution of ternary positive materials prepared in examples 1 to 8 in embodiments of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 13:
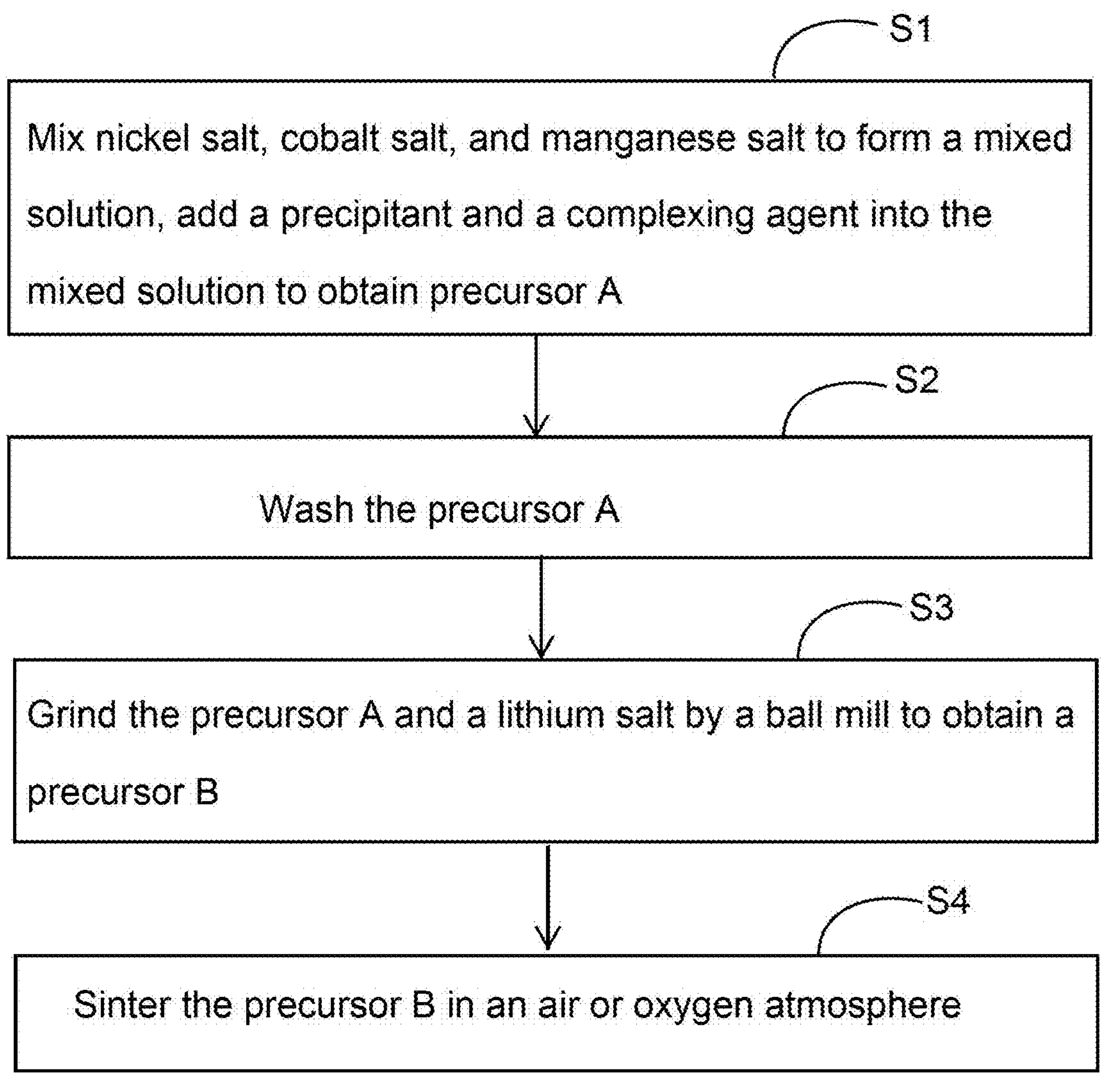
FIG. 13 is flowchart of a method for preparing a ternary positive material according to an embodiment of the present disclosure.

Referring to FIG. 13, a method for preparing a ternary positive material of large monocrystal-like particles is provided by way of example, as there are a variety of ways to carry out the method. Each block shown in the figure represents one or more processes, methods, or subroutines, carried out in the example method. Furthermore, the illustrated order of blocks is illustrative only and the order of the blocks can change. Additional blocks can be added, or fewer blocks may be utilized, or the order of the blocks may be changed, without departing from this disclosure. The method can begin at S1.

At S1, nickel salt, cobalt salt, and manganese salt are mixed into a solution. Then, the mixed solution is stirred with a stirring speed of 100 to 800 rpm. During stirring, a precipitant and a complexing agent are added into the mixed solution for initiating a co-precipitation reaction. A pH value of the mixed solution is adjusted to 10.5 to 12. Then, a precursor A is obtained after the co-precipitation reaction.

In at least one embodiment, an average particle size D50 of the precursor A is less than or equal to 9 μm (D50≤9 μm). When the average particle size of the precursor A is greater than 9 during the subsequent sintering process, lithium ions in lithium salt do not easily diffuse in the precursor A, and this inhibits the growth of particles.

In at least one embodiment, the nickel salt is selected from a group consisting of nickel sulfate, nickel chloride, nickel acetate, nickel nitrate, and any combination thereof. The cobalt salt is selected from a group consisting of cobalt sulfate, cobalt chloride, cobalt acetate, cobalt nitrate, and any combination thereof. The manganese salt is selected from a group consisting of manganese sulfate, manganese chloride, manganese acetate, manganese nitrate, and any combination thereof.

In at least one embodiment, the precipitant is selected from a group consisting of sodium hydroxide, potassium hydroxide, sodium carbonate, potassium carbonate, ammonium bicarbonate, lithium hydroxide, and any combination thereof. The complexing agent is selected from a group consisting of ethylenediamine tetraacetic acid, ammonia, ammonium citrate, ethylenediamine, ammonium acetate, and any combination thereof.

At S2, the precursor A is washed to remove anions on the precursor A.

At S3, the washed precursor A and the lithium salt are mixed and ground by a ball mill to obtain a precursor B.

In at least one embodiment, a mole number of lithium in the lithium salt is defined as M. A sum of mole numbers of nickel in the nickel salt, cobalt in the cobalt salt, and manganese in the manganese salt is defined as N. A ratio of M to N is in a range of 1.05 to 1.2 (M:N=1.05~1.2). When the ratio of M to N is less than 1.05, the final ternary positive material still has a surface morphology of spherical or spherical-like secondary particles. When the ratio of M to N is greater than 1.2, the particle size of the final ternary positive material may increase to 4 to 5 and the amount of impurities on the surface of the particles also increases. In addition, the particles of the final ternary positive material appear to agglomerate and harden, and the hardening phenomenon is more obvious with an increased ratio of M to N.

In at least one embodiment, the lithium salt is selected from a group consisting of lithium carbonate, lithium hydroxide, lithium acetate, and any combination thereof.

At S4, the precursor B is sintered in an air or an oxygen atmosphere. The sintering process includes a first sintering stage and a second sintering stage. The first sintering stage is heating to a first temperature of 400 to 800° C. at a first heating rate of 5 to 15° C./min, and sintering the precursor B at the first temperature for a first period of 1 to 6 h. The second sintering stage is heating to a second temperature of 900 to 980° C. at a second heating rate of 1 to 10° C./min, and sintering the precursor B at the second temperature for a second period of 8 to 10 h. After being cooled, the ternary positive material is obtained.

In the present disclosure, the particles in precursor B starts to grow to a larger size at the first temperature of 400 to 800° C. Then, the first temperature is increased to the second temperature of 900 to 980° C., which improves the morphological and structural stability of the particles and reduces mixing of cations. Thus, stable particles having a monocrystalline-like morphology are formed. The particles are the final ternary positive material. When the ternary positive material is used, the crushing and pulverizing processes are not needed, reducing the production cost, and avoiding poor stability of the ternary positive material after crushing. Thus, the cycle performance of the ternary positive material is improved.

A ternary positive material prepared by the above method is also provided according to the present disclosure. The ternary positive material includes a lithium nickel cobalt manganese compound with a chemical formula of $LiNi_xCo_yMn_zO_2$, wherein x+y+z=1, 0.2≤x≤0.8, 0.1≤y≤0.3. An average particle size of the primary particles of the lithium nickel cobalt manganese compound is greater than or equal to 1 μm, and also less than or equal to 2.5 μm. When the average particle size is greater than 2.5 μm, specific surface area of the lithium nickel cobalt manganese compound is small, which reduces the rate performance of the lithium-ion battery. When the average particle size is less than 1 μm, the specific surface area of the lithium nickel cobalt manganese compound would be too large, reducing the cycle life of the lithium-ion battery.

Figure 14:
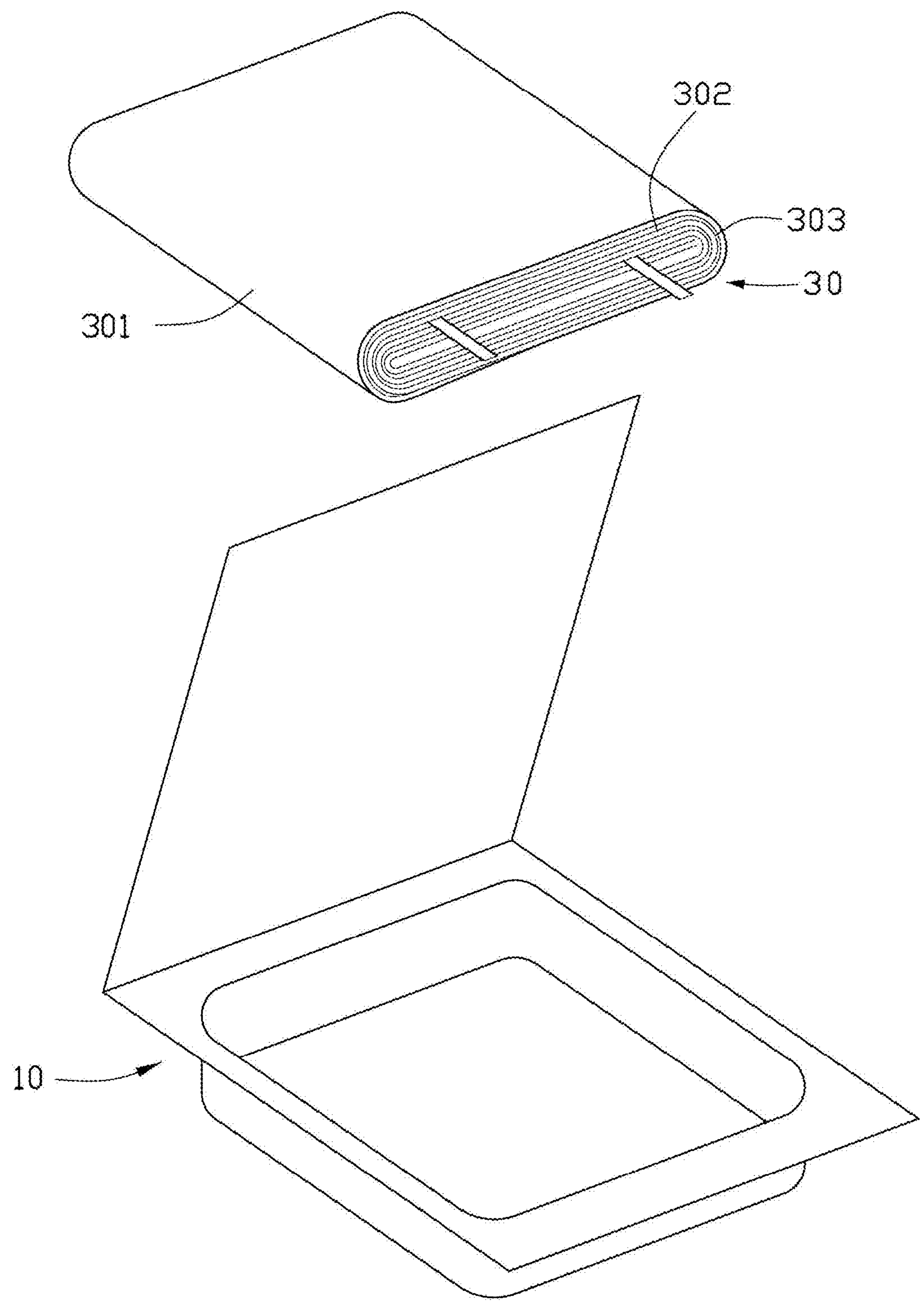
FIG. 14 is a diagrammatic view of a lithium-ion battery according to an embodiment of the present disclosure.

Referring to FIG. 14, a lithium-ion battery 100 is also provided according to an embodiment of the present disclosure. The lithium-ion battery 100 includes a shell 10 and an electrode assembly 30 received in the shell 10. The electrode assembly 30 comprises a positive electrode plate 301, a negative electrode plate 302, and a separator 303 sandwiched between the positive electrode plate 301 and the negative electrode plate 302. The positive electrode plate 301 includes a binder, a conductive agent, and the ternary positive material.

The present disclosure will be described in detail in combination with specific examples and comparative examples. Those skilled in the art will understand that the following examples are only used to explain the present disclosure and cannot be understood as limitations of the present disclosure. Unless otherwise defined, the reagents and instruments in the following examples are commercially available products.

Example 1

Nickel sulfate, cobalt sulfate, and manganese sulfate with a molar ratio of 0.533:0.199:0.268 were mixed to obtain a mixed solution. The mixed solution was stirred at 200 r/min. Sodium hydroxide solution and ammonia water were added into the above mixed solution, and the pH value of the mixed solution was adjusted to 12. Then, precursor A having a particle size D50 of 5 μm was obtained after precipitation. The molar ratio of nickel, cobalt, and manganese in the precursor A was 0.533:0.199:0.268.

Lithium carbonate and the precursor A were mixed and ground by a ball mill to obtain precursor B, where a molar ratio of Li/(Ni+Co+Mn) was 1.09. Then, the precursor B was loaded into a sintering furnace. The sintering furnace was heated to 750° C. at a rate of 3.5° C./min, and the precursor B was sintered at such temperature for 4 h. Then, the sintering furnace was heated to 930° C. at a rate of 2° C./min, and the precursor B was sintered at such temperature for 8 h. The sintering furnace was naturally cooled to room temperature to obtain the ternary positive material $LiNi_{0.533}Co_{0.199}Mn_{0.268}O_2$.

Example 2

Nickel sulfate, cobalt sulfate, and manganese sulfate with a molar ratio of 0.524:0.203:0.273 were mixed to obtain a mixed solution. The mixed solution was stirred at 200 r/min. Sodium hydroxide solution and ammonia water were added into the above mixed solution, and the pH value of the mixed solution was adjusted to 11.5. Then, precursor A having a particle size D50 of 5 μm was obtained after precipitation. The molar ratio of nickel, cobalt, and manganese in the precursor A was 0.524:0.203:0.273.

Lithium carbonate and the precursor A were mixed and ground by a ball mill to obtain precursor B, where a molar ratio of Li/(Ni+Co+Mn) was 1.09. Then, the precursor B was loaded into a sintering furnace. The sintering furnace was heated to 780° C. at a rate of 3.5° C./min, and the precursor B was sintered at such temperature for 3 h. Then, the sintering furnace was heated to 970° C. at a rate of 2° C./min, and the precursor B was sintered at such temperature for 10 h. The sintering furnace was naturally cooled to room temperature to obtain the ternary positive material $LiNi_{0.524}Co_{0.203}Mn_{0.273}O_2$.

Example 3

Nickel sulfate, cobalt sulfate, and manganese sulfate with a molar ratio of 0.522:0.203:0.275 were mixed to obtain a mixed solution. The mixed solution was stirred at 200 r/min. Sodium hydroxide solution and ammonia water were added into the above mixed solution, and the pH value of the mixed solution was adjusted to 11.5. Then, precursor A having a particle size D50 of 5 μm was obtained after precipitation. The molar ratio of nickel, cobalt, and manganese in the precursor A was 0.522:0.203:0.275.

Lithium carbonate and the precursor A were mixed and ground by a ball mill to obtain precursor B, where a molar ratio of Li/(Ni+Co+Mn) was 1.09. Then, the precursor B was loaded into a sintering furnace. The sintering furnace was heated to 700° C. at a rate of 3.5° C./min, and the precursor B was sintered at such temperature for 1 h. Then, the sintering furnace was heated to 900° C. at 2° C./min, and the precursor B was sintered at such temperature for 8 h. The sintering furnace was naturally cooled to room temperature to obtain the ternary positive material $LiNi_{0.522}Co_{0.203}Mn_{0.275}O_2$.

Example 4

Nickel sulfate, cobalt sulfate, and manganese sulfate with a molar ratio of 0.61:0.195:0.195 were mixed to obtain a mixed solution. The mixed solution was stirred at 200 r/min. Sodium hydroxide solution and ammonia water were added into the above mixed solution, and the pH value of the mixed solution was adjusted to 12. Then, precursor A having a particle size D50 of 5 μm was obtained after precipitation. The molar ratio of nickel, cobalt, and manganese in the precursor A was 0.61:0.195:0.195.

Lithium carbonate and the precursor A were mixed and ground by a ball mill to obtain precursor B, where a molar ratio of Li/(Ni+Co+Mn) was 1.08. Then, the precursor B was loaded into a sintering furnace. The sintering furnace was heated to 740° C. at a rate of 3.5° C./min, and the precursor B was sintered at such temperature for 2 h. Then, the sintering furnace was heated to 930° C. at a rate of 2° C./min, and the precursor B was sintered at such temperature for 8 h. The sintering furnace was naturally cooled to room temperature to obtain the ternary positive material $LiNi_{0.610}Co_{0.195}Mn_{0.195}O_2$.

Example 5

Nickel sulfate, cobalt chloride, and manganese chloride with a molar ratio of 0.532:0.202:0.266 were mixed to obtain a mixed solution. The mixed solution was stirred at 250 r/min. Sodium hydroxide solution and ammonia water were added into the above mixed solution, and the pH value of the mixed solution was adjusted to 12. Then, precursor A having a particle size D50 of 5 μm was obtained after precipitation. The molar ratio of nickel, cobalt, and manganese in the precursor A was 0.532:0.202:0.266.

Lithium carbonate and the precursor A were mixed and ground by a ball mill to obtain precursor B, where a molar ratio of Li/(Ni+Co+Mn) was 1.06. Then, the precursor B was loaded into a sintering furnace. The sintering furnace was heated to 720° C. at a rate of 3.5° C./min, and the precursor B was sintered at such temperature for 2 h. Then, the sintering furnace was heated to 930° C. at a rate of 2° C./min, and the precursor B was sintered at such temperature for 8 h. The sintering furnace was naturally cooled to room temperature to obtain the ternary positive material $LiNi_{0.532}Co_{0.202}Mn_{0.266}O_2$.

Example 6

Nickel sulfate, cobalt chloride, and manganese chloride with a molar ratio of 0.516:0.254:0.23 were mixed to obtain a mixed solution. The mixed solution was stirred at 250 r/min. Potassium hydroxide solution and ammonium citrate were added into the above mixed solution, and the pH value of the mixed solution was adjusted to 11.5. Then, precursor A having a particle size D50 of 5 μm was obtained after precipitation. The molar ratio of nickel, cobalt, and manganese in the precursor A was 0.516:0.254:0.23.

Lithium carbonate and the precursor A were mixed and ground by a ball mill to obtain precursor B, where a molar ratio of Li/(Ni+Co+Mn) was 1.06. Then, the precursor B was loaded into a sintering furnace. The sintering furnace was heated to 800° C. at a rate of 3.5° C./min, and the precursor B was sintered at such temperature for 6 h. Then, the sintering furnace was heated to 980° C. at a rate of 2° C./min, and the precursor B was sintered at such temperature for 10 h. The sintering furnace was naturally cooled to room temperature to obtain the ternary positive material $LiNi_{0.516}Co_{0.254}Mn_{0.230}O_2$.

Example 7

Nickel nitrate, cobalt nitrate, and manganese nitrate with a molar ratio of 0.606:0.195:0.199 were mixed to obtain a mixed solution. The mixed solution was stirred at 250 r/min. Sodium carbonate solution and ammonium citrate were added into the above mixed solution, and the pH value of the mixed solution was adjusted to 11.5. Then, precursor A having a particle size D50 of 5 μm was obtained after precipitation. The molar ratio of nickel, cobalt, and manganese in the precursor A was 0.606:0.195:0.199.

Lithium carbonate and the precursor A were mixed and ground by a ball mill to obtain precursor B, where a molar ratio of Li/(Ni+Co+Mn) was 1.06. Then, the precursor B was loaded into a sintering furnace. The sintering furnace was heated to 780° C. at a rate of 3° C./min, and the precursor B was sintered at such temperature for 3 h. Then, the sintering furnace was heated to 960° C. at a rate of 2° C./min, and the precursor B was sintered at such temperature for 10 h. The sintering furnace was naturally cooled to room temperature to obtain the ternary positive material $LiNi_{0.606}Co_{0.195}Mn_{0.199}O_2$.

Example 8

Nickel nitrate, cobalt nitrate, and manganese nitrate with a molar ratio of 0.607:0.195:0.198 were mixed to obtain a mixed solution. The mixed solution was stirred at 200 r/min. Lithium hydroxide solution and ammonia water were added into the above mixed solution, and the pH value of the mixed solution was adjusted to 12. Then, precursor A having a particle size D50 of 5 μm was obtained after precipitation. The molar ratio of nickel, cobalt, and manganese in the precursor A was 0.607:0.195:0.198.

Lithium carbonate and the precursor A were mixed and ground by a ball mill to obtain precursor B, where a molar ratio of Li/(Ni+Co+Mn) was 1.09. Then, the precursor B was loaded into a sintering furnace. The sintering furnace was heated to 780° C. at a rate of 3° C./min, and the precursor B was sintered at such temperature for 3 h. Then, the sintering furnace was heated to 960° C. at a rate of 2° C./min, and the precursor B was sintered at such temperature for 8 h. The sintering furnace was naturally cooled to room temperature to obtain the ternary positive material $LiNi_{0.607}Co_{0.195}Mn_{0.198}O_2$.

Comparative Example 1

Nickel nitrate, cobalt nitrate, and manganese nitrate with a molar ratio of 0.607:0.195:0.198 were mixed to obtain a mixed solution. The mixed solution was stirred at 200 r/min. Lithium hydroxide solution and ammonia water were added into the above mixed solution, and the pH value of the mixed solution was adjusted to 12. Then, precursor A having a particle size D50 of 5 μm was obtained after precipitation. The molar ratio of nickel, cobalt, and manganese in the precursor A was 0.607:0.195:0.198.

Lithium carbonate and the precursor A were mixed and ground by a ball mill to obtain precursor B, where a molar ratio of Li/(Ni+Co+Mn) was 1.09. Then, the precursor B was loaded into a sintering furnace. The sintering furnace was heated to 1020° C. at a rate of 2° C./min, and the precursor B was sintered at such temperature for 12 h. The sintering furnace was naturally cooled to room temperature to obtain the ternary positive material $LiNi_{0.607}Co_{0.195}Mn_{0.198}O_2$.

Comparative Example 2

Nickel nitrate, cobalt nitrate, and manganese nitrate with a molar ratio of 0.607:0.195:0.198 were mixed to obtain a mixed solution. The mixed solution was stirred at 200 r/min. Lithium hydroxide solution and ammonia water were added into the above mixed solution, and the pH value of the mixed solution was adjusted to 12. Then, precursor A having a particle size D50 of 5 μm was obtained after precipitation. The molar ratio of nickel, cobalt, and manganese in the precursor A was 0.607:0.195:0.198.

Lithium carbonate and the precursor A were mixed and ground by a ball mill to obtain precursor B, where a molar ratio of Li/(Ni+Co+Mn) was of 1.09. Then, the precursor B was loaded into a sintering furnace. The sintering furnace was heated to 650° C. at a rate of 3.5° C./min, and the precursor B was sintered at such temperature for 2 h. Then, the sintering furnace was heated to 850° C. at a rate of 2° C./min, and the precursor B was sintered at such temperature for 8 h. The sintering furnace was naturally cooled to room temperature. After crushing the precursor B, the crushed precursor B was sintered again. The sintering furnace was heated to 400° C. at a rate of 3° C./min, and the precursor B was sintered at such temperature for 8 h. The sintering furnace was naturally cooled to room temperature. After a repeated crushing, the precursor B was passed through 200-mesh sieve to obtain ternary positive material $LiNi_{0.607}Co_{0.195}Mn_{0.198}O_2$.

Figure 2:
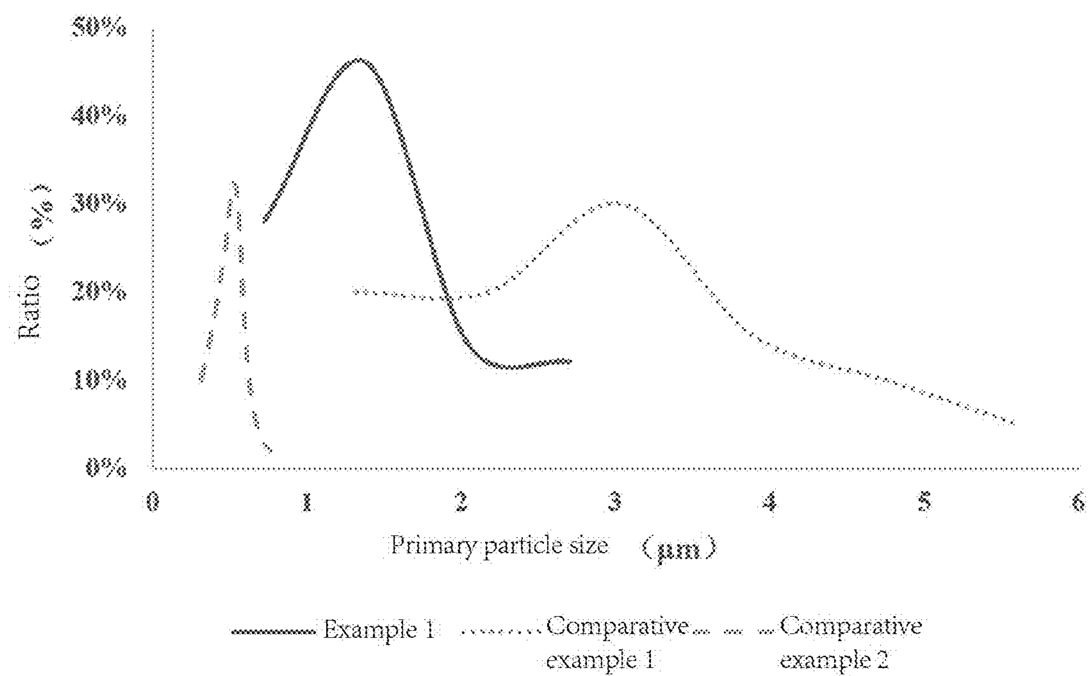
FIG. 2 is a diagram showing particle size distribution of ternary positive materials prepared in example 1 and comparative examples 1 and 2.
Figure 4:
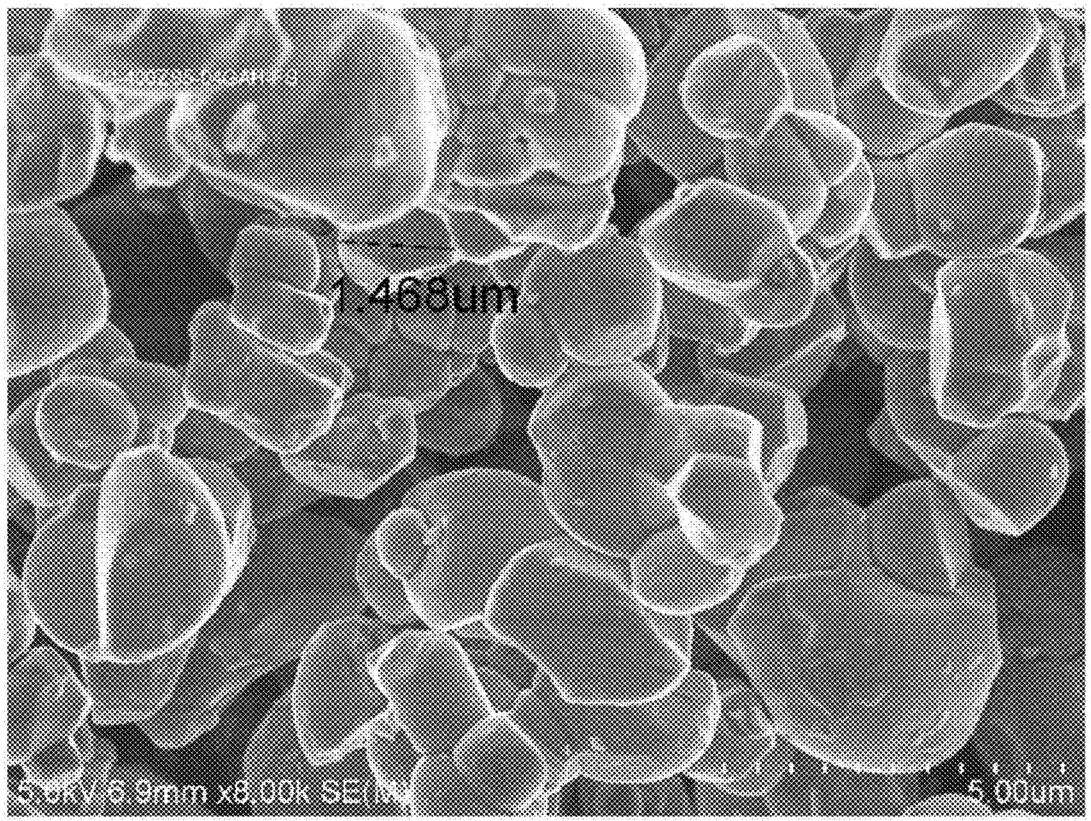
FIG. 4 is an SEM diagram of the ternary positive material prepared in example 2.
Figure 5:
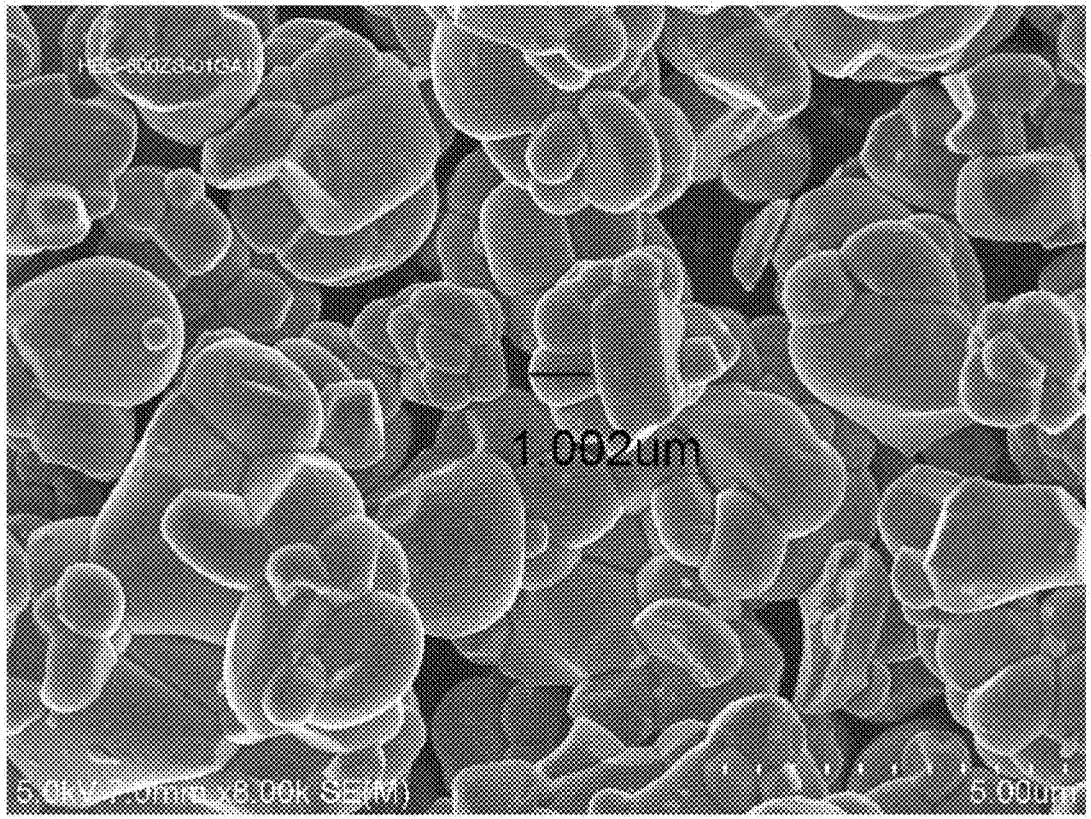
FIG. 5 is an SEM diagram of the ternary positive material prepared in example 3.
Figure 7:
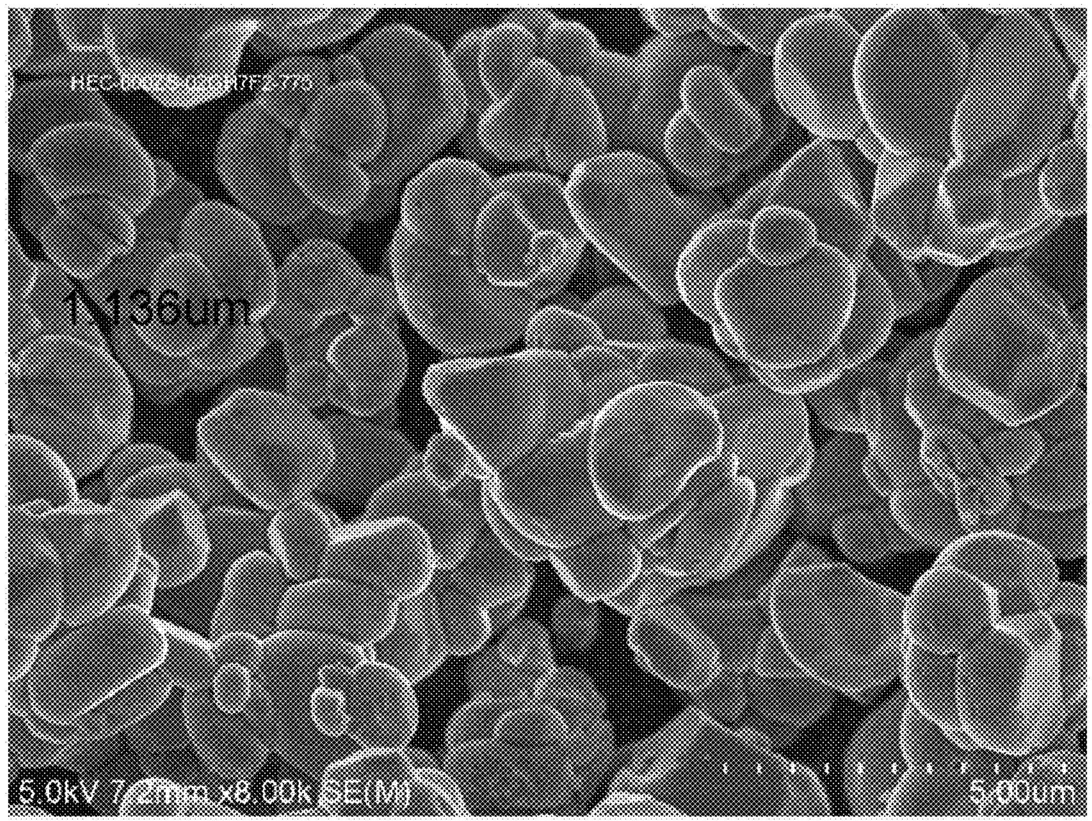
FIG. 7 is an SEM diagram of the ternary positive material prepared in example 5.
Figure 8:
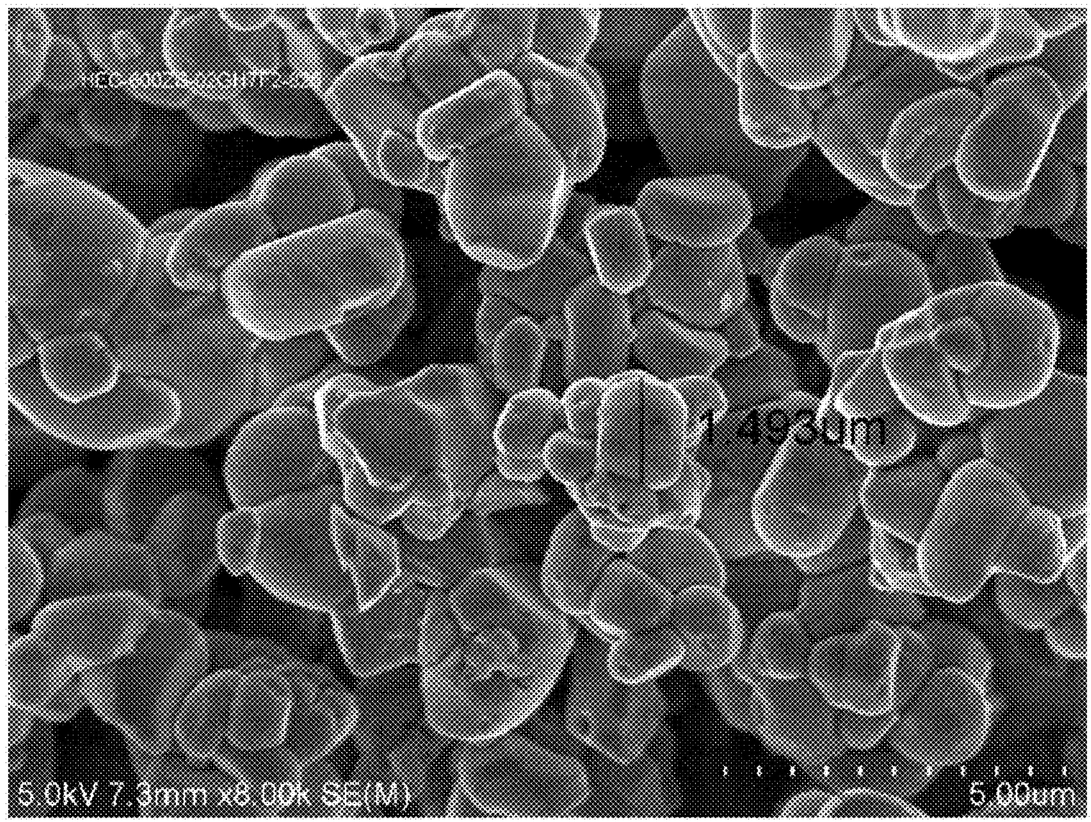
FIG. 8 is an SEM diagram of the ternary positive material prepared in example 6.
Figure 9:
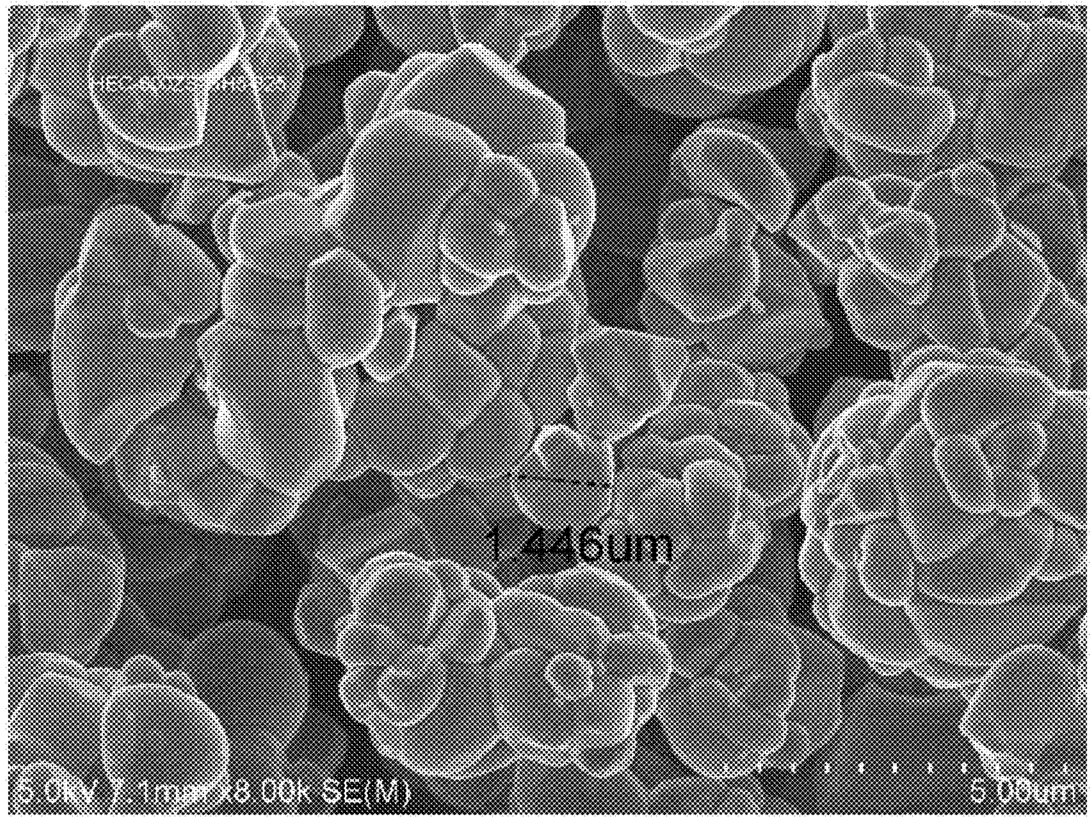
FIG. 9 is an SEM diagram of the ternary positive material prepared in example 7.
Figure 11:
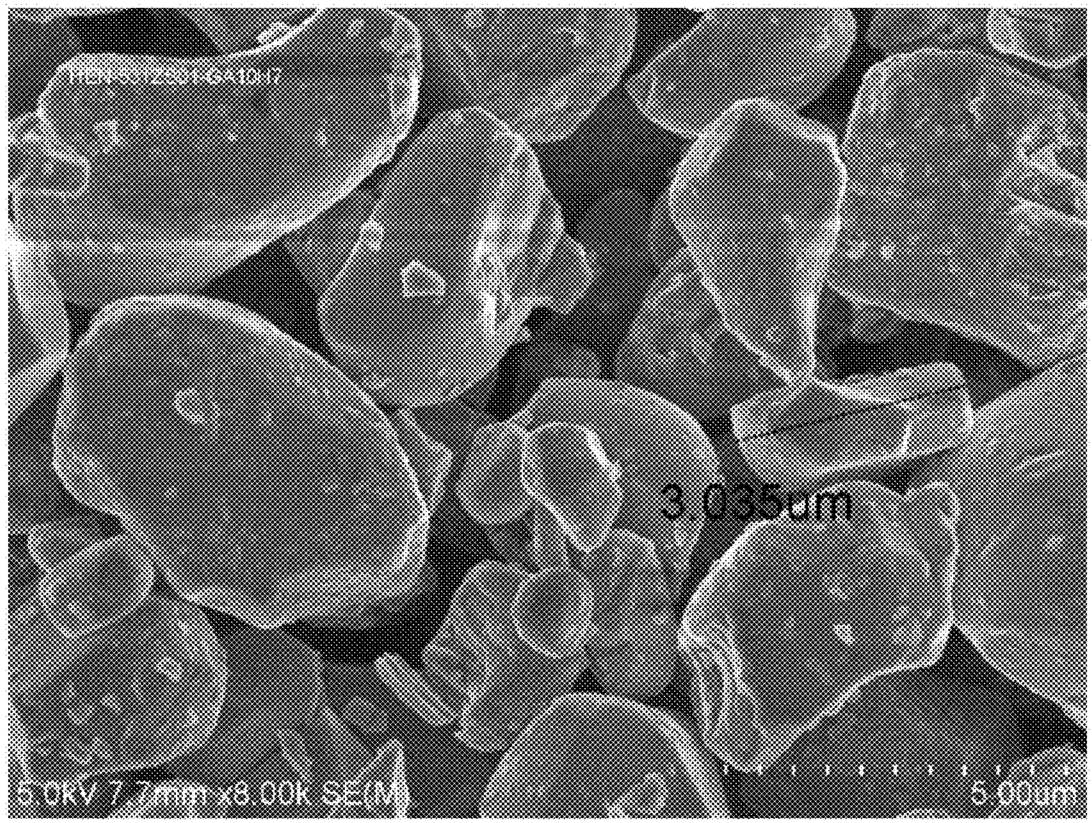
FIG. 11 is an SEM diagram of the ternary positive material prepared in comparative example 1.

Referring to FIGS. 1 and 2 and Tables 1 and 2, these record particle size distribution of examples 1-8 and comparative examples 1-2. Most of the particle sizes in examples 1-8 are distributed from 1 to 2 μm. The particle size in comparative example 1 is distributed from 3 to 4 μm. This is because the particles in precursor B in comparative example 1 grow at an accelerated rate at a high temperature to form large monocrystal particles. The particle size in comparative example 1 is less than 1 μm, and this is because that the material has been subjected to multiple times of sintering and crushing.

TABLE 1

| | <0.5 μm | 0.5~1 μm | 1~2 μm | 2~3 μm | 3~4 μm | >4 μm | Primary particle size |
|---|---|---|---|---|---|---|---|
| Example 1 | 0% | 28% | 46% | 26% | 0% | 0% | 1~2 μm |
| Example 2 | 0% | 22% | 43% | 32% | 4% | 0% | 1~2 μm |
| Example 3 | 0% | 16% | 74% | 10% | 0% | 0% | 1~2 μm |
| Example 4 | 0% | 26% | 58% | 16% | 0% | 0% | 1~2 μm |
| Example 5 | 0% | 10% | 70% | 20% | 0% | 0% | 1~2 μm |
| Example 6 | 0% | 20% | 74% | 6% | 0% | 0% | 1~2 μm |
| Example 7 | 0% | 20% | 70% | 10% | 0% | 0% | 1~2 μm |
| Example 8 | 0% | 20% | 56% | 12% | 12% | 0% | 1~2 μm |
| Comparative example 1 | 0% | 0% | 20% | 20% | 45% | 15% | 3~4 μm |
| Comparative example 2 | 50% | 50% | 0% | 0% | 0% | 0% | <0.5 μm |

Each of the ternary positive materials in examples 1-8 and 1-2 was further mixed with a conductive agent and a binder to prepare a slurry of a positive electrode plate. The ternary positive material, the conductive agent, and the binder were in a ratio of 92:5:3. The positive electrode plate, a separator, and a negative electrode plate made of carbon were laminated to obtain an electrode assembly. The electrode assembly was put into a shell, and an electrolyte was injected into the shell. The shell is then encapsulated to obtain a soft-packed battery. The first discharge specific capacity (1C, 20° C.), the cycle performance (300 weeks, 20° C.), and the storage performance (60° C., 7 days) of the soft-packed battery were tested with a battery tester, the test results being shown in Table 2. The storage performance was tested by measuring a change of thickness of the soft-packed battery after 7 days.

TABLE 2

| | Chemical formula | Li/(Ni + Co + Mn) | First discharge specific capacity (1 C, mAh/g) | Cycle performance (300 weeks, %) | Storage performance (60° C., 7 day, change of thickness, %) |
|---|---|---|---|---|---|
| Example 1 | $LiNi_{0.533}Co0_{.199}Mn_{0.268}O_2$ | 1.09 | 153.2 | 97.1 | 0.6 |
| Example 2 | $LiNi_{0.524}Co_{0.203}Mn_{0.273}O_2$ | 1.09 | 153.2 | 97.3 | 0.9 |
| Example 3 | $LiNi_{0.522}Co_{0.203}Mn_{0.275}O_2$ | 1.09 | 153.6 | 97.1 | 1.2 |
| Example 4 | $LiNi_{0.610}Co_{0.195}Mn_{0.195}O_2$ | 1.08 | 153.9 | 97.6 | 1.5 |
| Example 5 | $LiNi_{0.532}Co_{0.202}Mn_{0.266}O_2$ | 1.06 | 153.4 | 97.4 | 1.1 |
| Example 6 | $LiNi_{0.516}Co_{0.254}Mn_{0.230}O_2$ | 1.06 | 154.6 | 97.2 | 0.8 |
| Example 7 | $LiNi_{0.606}Co_{0.195}Mn_{0.199}O_2$ | 1.06 | 153.3 | 97.5 | 0.7 |
| Example 8 | $LiNi_{0.607}Co_{0.195}Mn_{0.198}O_2$ | 1.09 | 153.7 | 97.7 | 1.2 |
| Comparative example 1 | $LiNi_{0.607}Co_{0.195}Mn_{0.198}O_2$ | 1.09 | 143.7 | 97.0 | 1.0 |
| Comparative example 2 | $LiNi_{0.607}Co_{0.195}Mn_{0.198}O_2$ | 1.09 | 154.1 | 93.1 | 3.1 |

Table 2 shows that the first discharge capacity and the cycle performance of the soft-packed batteries in examples 1-8 are relatively high, and the change of thickness is small. This is because the particles are not subjected to crushing, allowing the positive material to have good stability and no pulverization at the particle interface. In comparative example 1, due to the high temperature in the sintering process, the particle size is too large, and the grains agglomerate and harden. Thus, mixing of cations in the ternary positive material becomes serious, resulting in reduction of the first discharge capacity of the soft-packed battery. In comparative example 2, due to repeated crushing processes, the stability of the ternary positive material is poor, and the cycle performance of the soft-packed battery is reduced. There is large change of thickness of the positive electrode plate, indicating that the ternary positive material in the present disclosure improves the strength and the compacted density of the particles.

Hitachi SEM is used to test the surface morphology of the ternary positive material, and the results are shown in FIGS. 3 to 12. The ternary positive material in FIGS. 3 to 10 includes monocrystal-like particles. The ternary positive material in FIG. 11 includes large particles. The ternary positive material in FIG. 12 includes spherical secondary particles having a particle size of 0.5 μm.

The embodiments shown and described above are only examples. Therefore, many commonly-known features and details are neither shown nor described. Even though numerous characteristics and advantages of the present technology have been set forth in the foregoing description, together with details of the structure and function of the present application, the disclosure is illustrative only, and changes may be made in the detail, including in matters of shape, size, and arrangement of the parts within the principles of the present application, up to and including the full extent established by the broad general meaning of the terms used in the claims. It will, therefore, be appreciated that the embodiments described above may be modified within the scope of the claims.

What is claimed is:

1. A method for preparing ternary positive material, comprising:

mixing a nickel salt, a cobalt salt, and a manganese salt to form a mixed solution, and stirring the mixed solution with a stirring speed of 100 to 800 rpm;

adding a precipitant and a complexing agent into the mixed solution when stirring the mixed solution, thereby adjusting a pH value of the mixed solution to a range of 10.5 to 12 and obtaining a precursor A, the precursor A having an average particle size D50 less than or equal to 9 μm;

grinding the precursor A and a lithium salt by a ball mill to obtain a precursor B; and sintering the precursor B in an air or oxygen atmosphere, the sintering comprising heating a sintering furnace to a first temperature of 400 to 800° C. at a first speed of 5 to 15° C./min and sintering the precursor B at the first temperature for 1 to 6 hours, and then heating the sintering furnace to a second temperature of 900 to 980° C. at a second speed of 1 to 10° C./min and sintering the precursor B at the second temperature for 8 to 10 hours, cooling the precursor B, thereby obtaining the ternary positive material.

2. A method for preparing ternary positive material of large monocrystal-like particles, comprising:

mixing a nickel salt, a cobalt salt, and a manganese salt to form a mixed solution, and stirring the mixed solution with a stirring speed of 100 to 800 rpm;

adding a precipitant and a complexing agent into the mixed solution when stirring the mixed solution, thereby adjusting a pH value of the mixed solution to a range of 10.5 to 12 and obtaining a precursor A, the precursor A having an average particle size D50 less than or equal to 9 μm;

grinding the precursor A and a lithium salt by a ball mill to obtain a precursor B; and sintering the precursor B in an air or oxygen atmosphere, the sintering comprising heating a sintering furnace to a first temperature of 400 to 800° C. at a first speed of 5 to 15° C./min and sintering the precursor B at the first temperature for 1 to 6 hours, and then heating the sintering furnace to a second temperature of 900 to 980° C. at a second speed of 1 to 10° C./min and sintering the precursor B at the second temperature for 8 to 10 hours, cooling the precursor B, thereby obtaining the ternary positive material including a lithium nickel cobalt manganate compound with a chemical formula of $LiNi_xCo_yMn_zO_2$, wherein $x+y+z=1$, $0.2 \leq x \leq 0.8$, $0.1 \leq y \leq 0.3$, primary particles of the lithium nickel cobalt manganate compound having an average particle size greater than or equal to 1 μm and less than or equal to 2.5 μm.

3. The method according to claim 2, wherein a mole number of lithium in the lithium salt is M, a sum of mole numbers of nickel in the nickel salt, cobalt in the cobalt salt, and manganese in the manganese salt is N, M:N is 1.05 to 1.2.

4. The method according to claim 2, wherein the precipitant is selected from a group consisting of sodium hydroxide, potassium hydroxide, sodium carbonate, potassium carbonate, ammonium bicarbonate, lithium hydroxide, and any combination thereof.

5. The method according to claim 2, wherein the complexing agent is selected from a group consisting of ethylenediamine tetraacetic acid, ammonia, ammonium citrate, ethylenediamine, ammonium acetate, and any combination thereof.

6. The method according to claim 2, wherein the lithium salt is selected from a group consisting of lithium carbonate, lithium hydroxide, lithium acetate, and any combination thereof.

7. The method according to claim 2, wherein the nickel salt is selected from a group consisting of nickel sulfate, nickel chloride, nickel acetate, nickel nitrate, and any combination thereof.

8. The method according to claim 2, wherein the cobalt salt is selected from a group consisting of cobalt sulfate, cobalt chloride, cobalt acetate, cobalt nitrate, and any combination thereof.

9. The method according to claim 2, wherein the manganese salt is selected from a group consisting of manganese sulfate, manganese chloride, manganese acetate, manganese nitrate, and any combination thereof.

10. The method according to claim 2, wherein the average particle size D50 of the precursor A is greater than or equal to 5 μm and less than or equal to 9 μm.

11. The method according to claim 2, wherein the pH value of the mixed solution is in a range of 11.5 to 12.

* * * * *